US012073734B2

(12) United States Patent
Kuehnle et al.

(10) Patent No.: US 12,073,734 B2
(45) Date of Patent: Aug. 27, 2024

(54) AUTOMATIC TEACHING DEVICE (71) Applicant: RM ACQUISITION, LLC, Chicago, IL (US)

(72) Inventors: Andreas U. Kuehnle, Villa Park, CA (US); Andre Tokman, San Clemente, CA (US); Shaun M. Howard, Irvine, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 17/404,137

(22) Filed: Aug. 17, 2021

(65) Prior Publication Data

US 2023/0057393 A1 Feb. 23, 2023

(51) Int. Cl.
G09B 19/16 (2006.01)
G09B 5/06 (2006.01)

(52) U.S. Cl.
CPC ........... *G09B 19/167* (2013.01); *G09B 5/065* (2013.01)

(58) Field of Classification Search
CPC ...... G09B 19/16; G09B 19/167; G09B 5/065; B60W 30/08–0953; B60W 40/02–06; B60W 40/09; B60W 50/08
See application file for complete search history.

(56) References Cited

U.S. PATENT DOCUMENTS

| | | | |
|---|---|---|---|
| 7,659,827 B2 | 2/2010 | Gunderson et al. | |
| 9,180,888 B1 | 11/2015 | Fields et al. | |
| 10,013,893 B2 | 7/2018 | Harkness | |
| 2005/0158697 A1* | 7/2005 | Nelson | G09B 7/00 434/350 |
| 2006/0040239 A1* | 2/2006 | Cummins | G09B 9/05 434/62 |
| 2006/0057543 A1 | 3/2006 | Roald | |
| 2008/0122603 A1* | 5/2008 | Plante | G07C 5/085 340/439 |
| 2013/0209968 A1 | 8/2013 | Miller et al. | |
| 2014/0236386 A1* | 8/2014 | Yoshizawa | B60W 30/08 701/1 |
| 2016/0196613 A1* | 7/2016 | Miles | G01W 1/00 705/4 |

(Continued)

FOREIGN PATENT DOCUMENTS

EP 0 299 911 B1 9/1992

*Primary Examiner* — Kang Hu
*Assistant Examiner* — Correll T French
(74) *Attorney, Agent, or Firm* — Crowell & Moring LLP (57) ABSTRACT A system and method for monitoring a driver's operation of a vehicle and automatically providing a lesson to a driver based on the driver's operation are provided. Input data generated by an onboard vehicle computing system specifying actions taken by the driver while operating the vehicle are received. Based on the input data, a determination is made whether a driving event has occurred that requires the lesson to be output to the driver. The driving event is analyzed based on threshold data stored in the memory, and based on the results of the analysis of the driving event one or more lessons are automatically output to the driver. Additionally, the driver's completion of the lesson can be monitored, and subsequent instances of the driver's operation of the vehicle may include controlling movement of the vehicle based on the results of the analysis of the driving event.

22 Claims, 5 Drawing Sheets

(56) References Cited

U.S. PATENT DOCUMENTS

| | | | | |
|---|---|---|---|---|
| 2016/0298971 A1* | 10/2016 | Mughal | ................ | G09B 19/167 |
| 2018/0032072 A1* | 2/2018 | Hoye | .................. | B60W 50/082 |
| 2018/0061274 A1* | 3/2018 | Frahling | ............... | G06F 40/247 |
| 2019/0012630 A1* | 1/2019 | Moss | ................... | G06Q 10/105 |
| 2019/0061745 A1* | 2/2019 | Hatano | ............ | B60W 60/0053 |
| 2019/0265712 A1* | 8/2019 | Satzoda | ............... | G05D 1/0246 |
| 2019/0308617 A1* | 10/2019 | Groult | ................... | B60Q 1/543 |
| 2020/0079369 A1* | 3/2020 | Kuehnle | ............... | G06V 10/82 |

* cited by examiner

AUTOMATIC TEACHING DEVICE

BACKGROUND AND SUMMARY OF THE INVENTION

The present invention is directed to a system and method for monitoring the vehicle operation of a driver and automatically providing lessons and active feedback to the driver in order to improve the driver's performance.

Systems for wirelessly collecting and transmitting safety data and video from a vehicle are known. The system known as SafteyDirect® by Bendix CVS is an example of such a system. With data delivered in real time by SafetyDirect®, vehicle fleets can assess driving trends and develop targeted driver training that addresses the real issues taking place on the road.

SafetyDirect® records events produced by extreme signals, e.g., excessive braking, unwanted lane departure, insufficient headway, etc. The recordings contain video of the event before, during and after the event (i.e., pre- and post-event (PPE) data) and the vehicle/driver signals/dynamics during the event (brake pressure, steering angle, speed, deceleration, location, etc.). For drivers who produce too many of these extreme events, it is desired to provide these drivers with pedagogical material in lesson form, with the purpose of improving their driving. Described herein is an app-based system for this purpose. The pedagogical material is automatically collected, created, and assembled into lessons for the driver that are directed to the particular environment(s) in which these extreme events occur.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
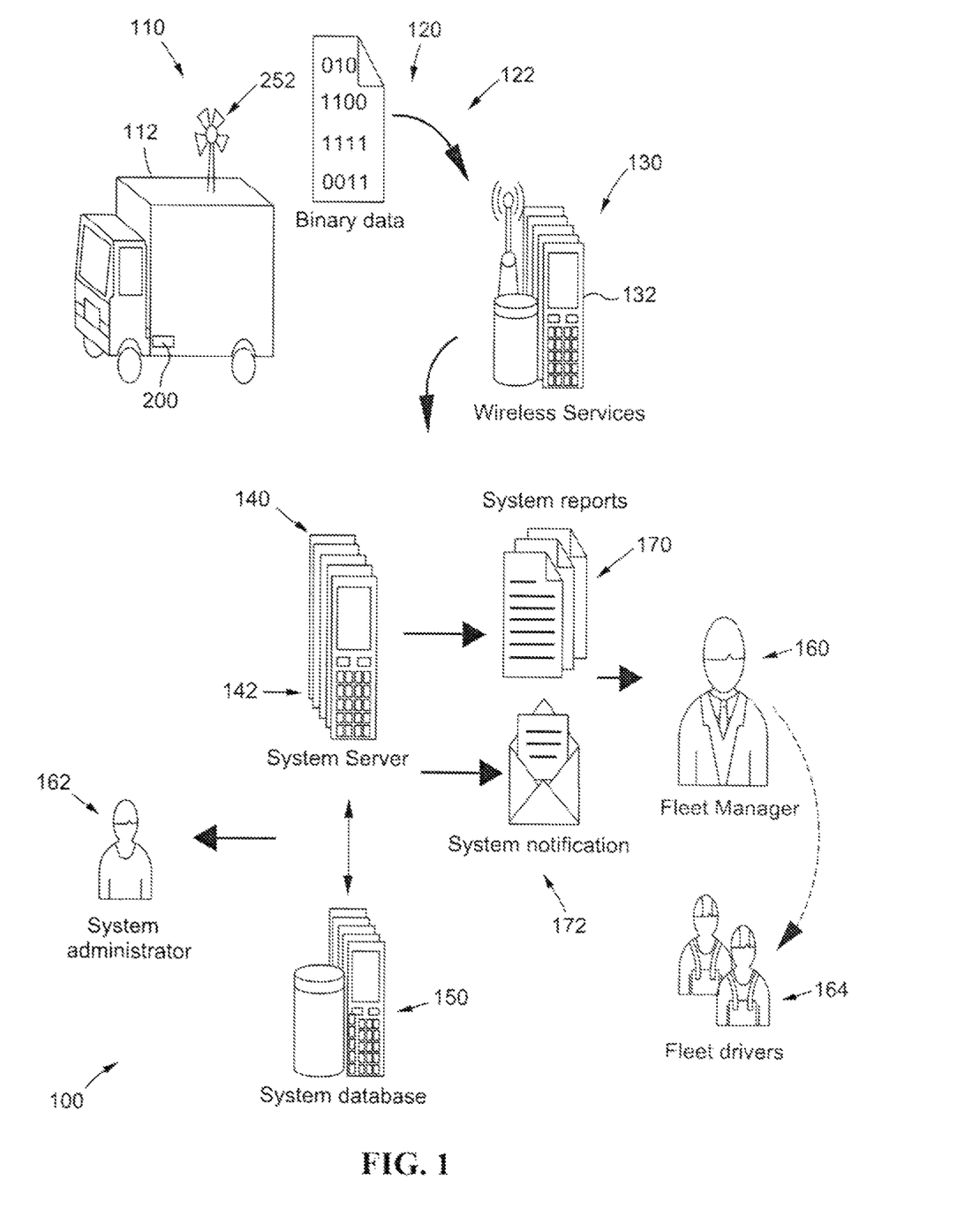
FIG. 1 illustrates an overview of a system 100 in accordance with an embodiment of the present invention.

FIG. 1 illustrates an overview of a system 100 in accordance with an embodiment of the present invention. In this example embodiment, vehicles 110, such as trucks and cars, and particularly fleet vehicles 112, may be configured with an event detection and reporting system 200 (see FIG. 2A), which may be an in-vehicle computing system that generates actual data relating to driving and vehicle events that may be of interest to a fleet manager or other user. Such a system 200 may include for example a Lane Departure Warning (LDW) system 222 (FIG. 2A) that may generate signals indicative of an actual lane departure, such as lane wandering or crossing. Additionally, secondary systems to be described in greater detail below with reference to FIG. 2A may be carried by the vehicles or installed in the vehicle systems, including one or more video cameras, radar, lidar, transmission, engine, tire pressure monitoring and braking systems, for example, that may generate additional safety event data and driver behavior data. Front facing cameras, radar and lidar-based system may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112.

One or more servers 140 of the system 100 may be configured to selectively download, receive, or otherwise retrieve data either directly from the vehicles 112 via the service providers 130 or from collection servers 132 which may be third party servers from one or more various telematics suppliers or cellular providers. Servers 140 may be configured to initiate processing of the event data in manners to be described in greater detail below.

A web application 142 executable on the one or more servers 140 of the system 100 may include a dynamic graphical user interface for fleet managers 160 and administrators 162 to view all the information once it is processed. The system 100 of the example embodiment may also include one or more databases 150 configured to selectively store all event information provided from the vehicles 112 in the fleet 110 for one or more designated time intervals, including raw and post-processed trip data.

In accordance with the example embodiment, the system administrators 162 may be users who are provided with interfaces to configure and manage fleets, monitor platform performance, view alerts issued by the platform, and view driver and event data and subsequent processing logs and/or views. Fleet managers 160 may view event information for their respective fleet for internal processing. These events may arrive via user-initiated reports 170 in the web application 142 executable on the one or more servers 140, or via email or other notifications 172. Fleet managers 160 may, depending on internal policies and processes or for other reasons, also interface with individual drivers 164 regarding performance goals, corrections, reports, or coaching.

Figure 2A:
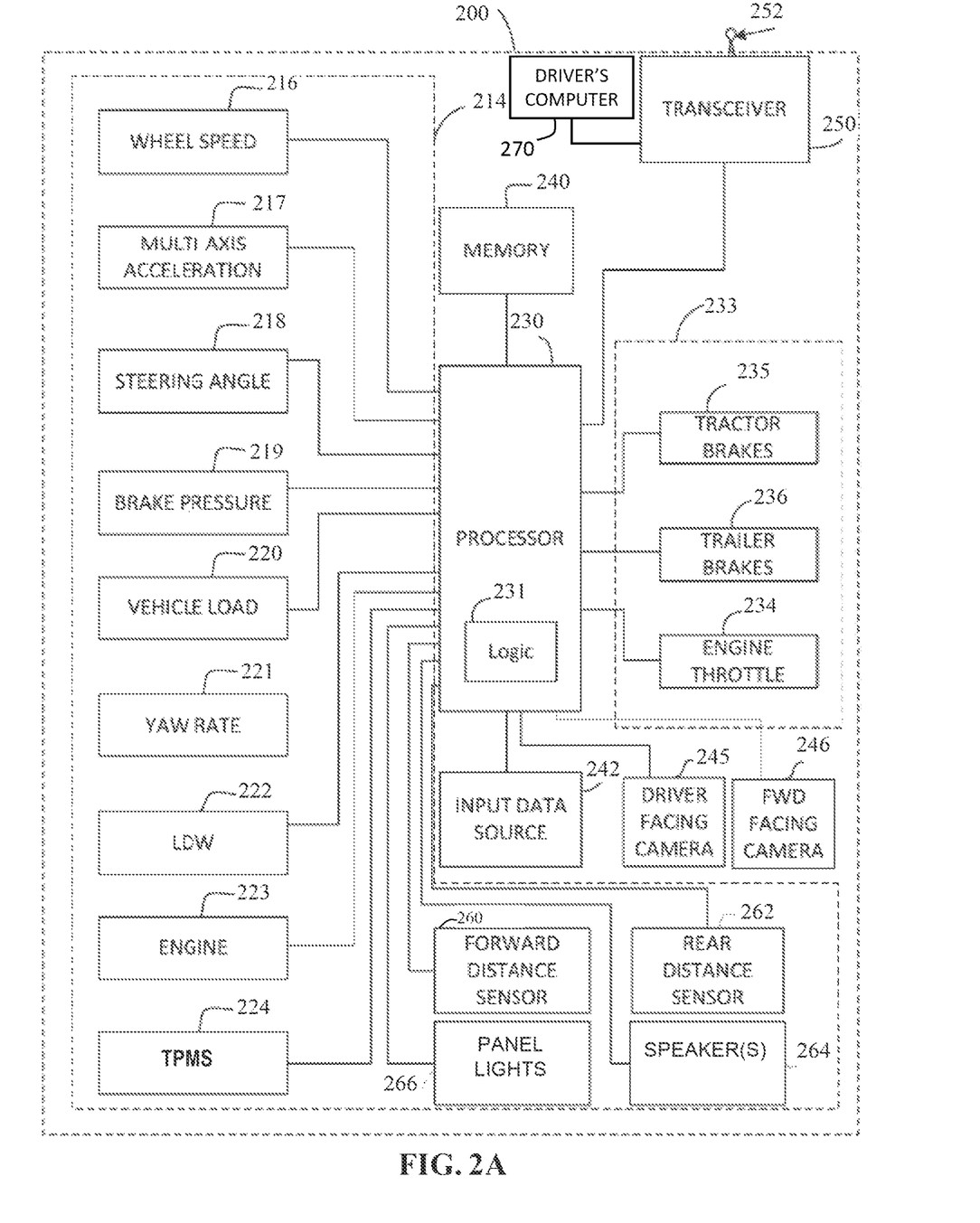
FIG. 2A illustrates is a schematic block diagram of an event detection and reporting system according to the present invention.

Referring now to FIG. 2A, depicted is a schematic block diagram that illustrates details of an event detection and reporting system mentioned above, and which is configured to be used in accordance with an embodiment of the present subject matter. As further detailed below, the in-vehicle event detection and reporting system 200 may be adapted to detect a variety of operational parameters and conditions of the vehicle 112 and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 200 of FIG. 2A may include one or more devices or systems 214 for providing input data indicative of one or more operating parameters or one or more conditions of a commercial vehicle 112. Alternatively, the event detection and reporting system 200 may include a signal interface for receiving signals from the one or more devices or systems 214, which may be configured separate from the system 200. For example, the devices 214 may be one or more sensors such as, but not limited to, one or more wheel speed sensors 216, one or more acceleration sensors/accelerometers, such as multi-axis acceleration sensors 217, a steering angle sensor 218, a brake pressure sensor 219, one or more vehicle load sensors 220, a yaw rate sensor 221, a lane departure warning (LDW) sensor or system 222, one or more engine speed or condition sensors 223, and a tire pressure (TPMS) monitoring system 224. The event detection and reporting system 200 may also utilize additional devices or sensors in the exemplary embodiment including, for example, a forward distance sensor 260 and a rear distance sensor 262 (e.g., radar, lidar, etc.). Other sensors and/or actuators or power generation devices or combinations thereof may be used or otherwise provided as well, and one or more devices or sensors may be combined into a single unit as may be necessary and/or desired.

The event detection and reporting system 200 may also include instrument panel lights 266 and speaker(s) 264, which may be usable to provide headway time/safe following distance warnings, lane departure warnings, and warnings relating to braking and or obstacle avoidance events. The event detection and reporting system 200 further includes a computing device 270 of the driver, which can be any kind of computing device capable of providing video, audio and text outputs to the driver (e.g., phone, pad, PC). As further described herein, the lessons are provided to the driver via the driver's computing device 270. Alternatively, the lessons can be provided to the driver via a similar fleet system.

The event detection and reporting system 200 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to one or more stored threshold values or desired averages or time history shapes, or to process the input data and compare the raw or processed input data to one or more circumstance-dependent desired values. The processor's 230 role may be to process input and outputs regarding safety, warning, or indication systems of the vehicle 112 and may be distinct from other onboard vehicle 112 processors that perform tasks such as controlling the ignition timing, obtaining measurements from a mass airflow sensor (MAF), pulsing fuel injectors, and the like. Processor 230 may communicate with other vehicle 112 processors via a vehicle data bus, such as a Controller Area Network (CAN bus), for example.

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle 112 to initiate corrective action. For example, the processor 230 may generate and send the control signal to an engine electronic control unit or an actuating device to reduce the engine throttle 234 and slow the vehicle 112 down. Further, the processor 230 may send the control signal to one or more vehicle brake systems 235, 236 to selectively engage the brakes (e.g., a differential braking operation). A variety of corrective actions are possible and multiple corrective actions may be initiated and executed at the same time.

The event detection and reporting system 200 may also include a memory portion 240 for storing and accessing system information, such as the system control logic 231. The memory portion 240, however, may be separate from the processor 230. The sensors 214 and processor 230 may be part of a pre-existing system or use components of a pre-existing system.

The event detection and reporting system 200 may also include a source of input data 242 indicative of a configuration/condition of a commercial vehicle 112. The processor 230 may sense or estimate the configuration/condition of the vehicle 112 based on the input data, and may select a control tuning mode or sensitivity based on the vehicle configuration/condition. The processor 230 may compare the operational data received from the sensors or systems 214 to the information provided by the tuning.

In addition, the event detection and reporting system 200 may be operatively coupled with one or more driver-facing imaging devices, shown in the example embodiment for simplicity and ease of illustration as a single driver facing camera 245 that may be trained on the driver and/or trained on the interior of the cab of the commercial vehicle 112. However, it should be appreciated that one or more physical video cameras may be disposed on the vehicle 112, such as a video camera on each corner of the vehicle 112, one or more cameras mounted remotely and in operative communication with the event detection and reporting system 200, such as a forward-facing camera 246 to record images of the roadway ahead of the vehicle 112. In the example embodiments, driver data may be collected directly using the driver facing camera 245 in accordance with a detected driver head position, hand position, or the like, within the vehicle being operated by the driver. In addition, driver identity may be determined based on facial recognition technology and/or body/posture template matching.

The event detection and reporting system 200 may also include a transmitter/receiver (transceiver) module 250, such as a radio frequency (RF) transmitter, including one or more antennas 252 for wireless communication of the automated control requests, GPS data, one or more various vehicle configuration and/or condition data, or the like between the vehicles and one or more destinations such as to one or more services (not shown) having a corresponding receiver and antenna. In an example, the transceiver may communicate cellularly using its antenna 252 over a cellular telephone network with a cloud-based computing system. The cloud computing system may be implemented, for example, by one or more servers 140, and/or servers 132. The transmitter/receiver (transceiver) module 250 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 may be operative to combine selected ones of the collected signals from the sensor systems described above into processed data representative of higher-level vehicle condition data, such as data from the multi-axis acceleration sensors 217, that may be combined with the data from the steering angle sensor 218 to determine excessive curve speed event data. Other hybrid event data relatable to the vehicle 112 and driver of the vehicle 112 and obtainable from combining one or more selected raw data items from the sensors includes, for example and without limitation, excessive braking event data, excessive curve speed event data, lane departure warning event data, excessive lane departure event data, lane change without turn signal event data, loss of video tracking (LOVT) event data, LDW system disabled event data, distance alert event data, forward collision warning event data, haptic warning event data, collision mitigation braking event data, ATC event data, ESP event data, RSP event data, ABS event data, TPMS event data, engine system event data, average following distance event data, average fuel consumption event data, average ACC usage event data, excessive lane changing, improper environmental awareness scanning, and late speed adaptation (such as that given by signage or exiting).

The event detection and reporting system 200 of FIG. 2A may be suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random-access memory (RAM) or other dynamic storage device for storing instructions and loaded portions of the trained neural network to be executed by the processor 230, and read only memory (ROM) or other static storage device for storing other static information and instructions for the processor 230. Other storage devices may also suitably be provided for storing information and instructions as necessary or desired.

Instructions may be read into the main memory 240 from another computer-readable medium, such as another storage device via the transceiver 250. Execution of the sequences of instructions contained in main memory 240 may cause the processor 230 to perform the process steps described herein. In an alternative implementation, hard-wired circuitry may be used in place of or in combination with software instructions to implement the present subject matter. Thus, implementations of the example embodiments are not limited to any specific combination of hardware circuitry and software.

Figure 2B:
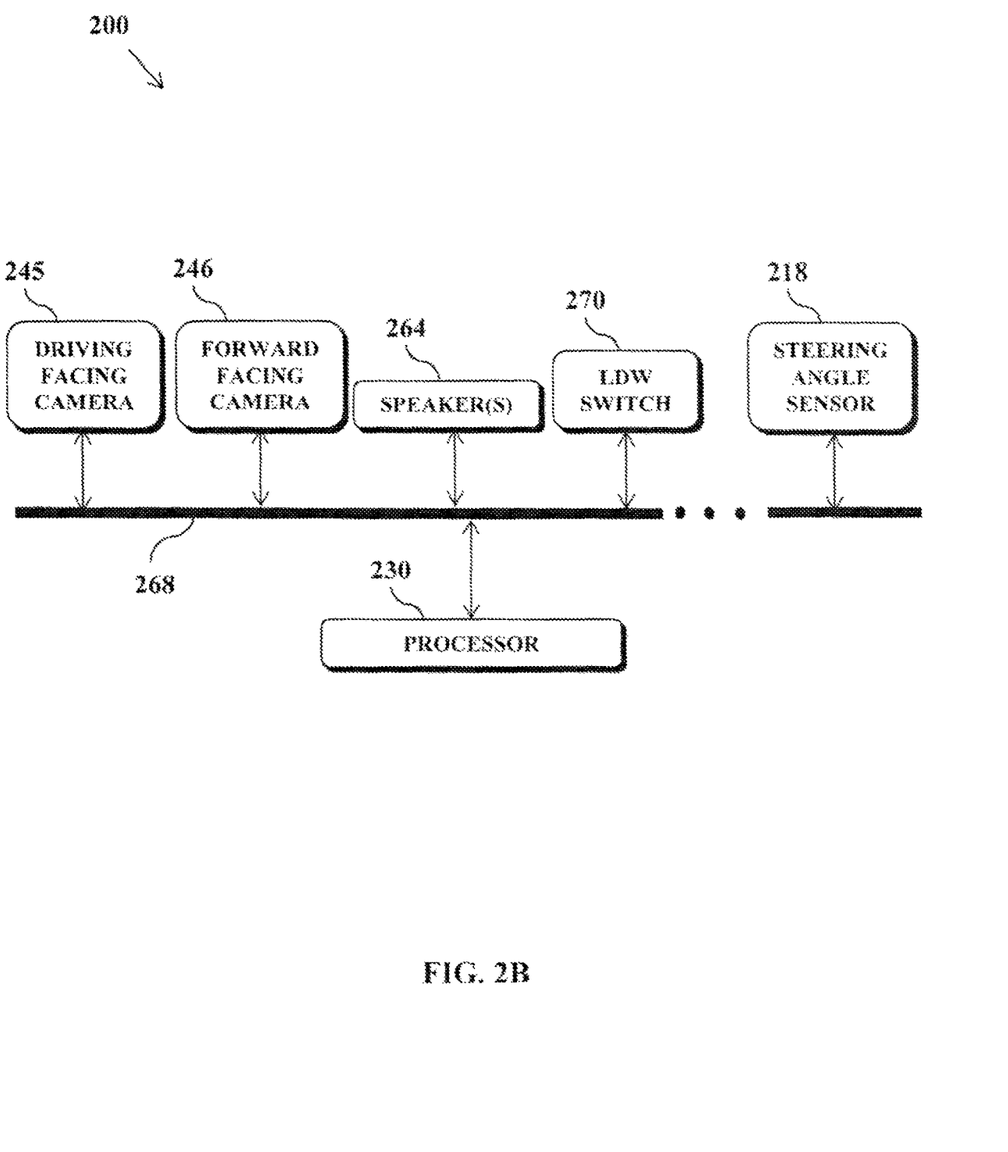
FIG. 2B illustrates a simplified schematic block diagram of the event detection and reporting system in FIG. 2A.

Referring now to FIG. 2B, only certain components of the event detection and reporting system 200 of FIG. 2A are depicted. As shown, various components of the system 200 are shown as being in communication with processor 230 by being connected to a vehicle bus 268, which can be a private bus dedicated to the system 200 or a general vehicle bus, CAN bus, and the like. As shown, in addition to DFC 245, FFC 246, speaker(s) 246 and steering angle sensor 218, an LDW switch 270 may also be shown as being in communication with processor 230 via bus 268. LDW switch 270 may be a component provided in the interior of a vehicle by which the driver can legitimately switch off the LDW system 222 on a temporary basis. This functionality may be provided so that drivers 164 can temporarily avoid receiving repeated unwarranted warnings due to certain unusual road conditions, such as passing through a construction area where lanes are significantly narrowed, rendering it impossible or very difficult to otherwise setting off the LDW system 222.

Figure 3:
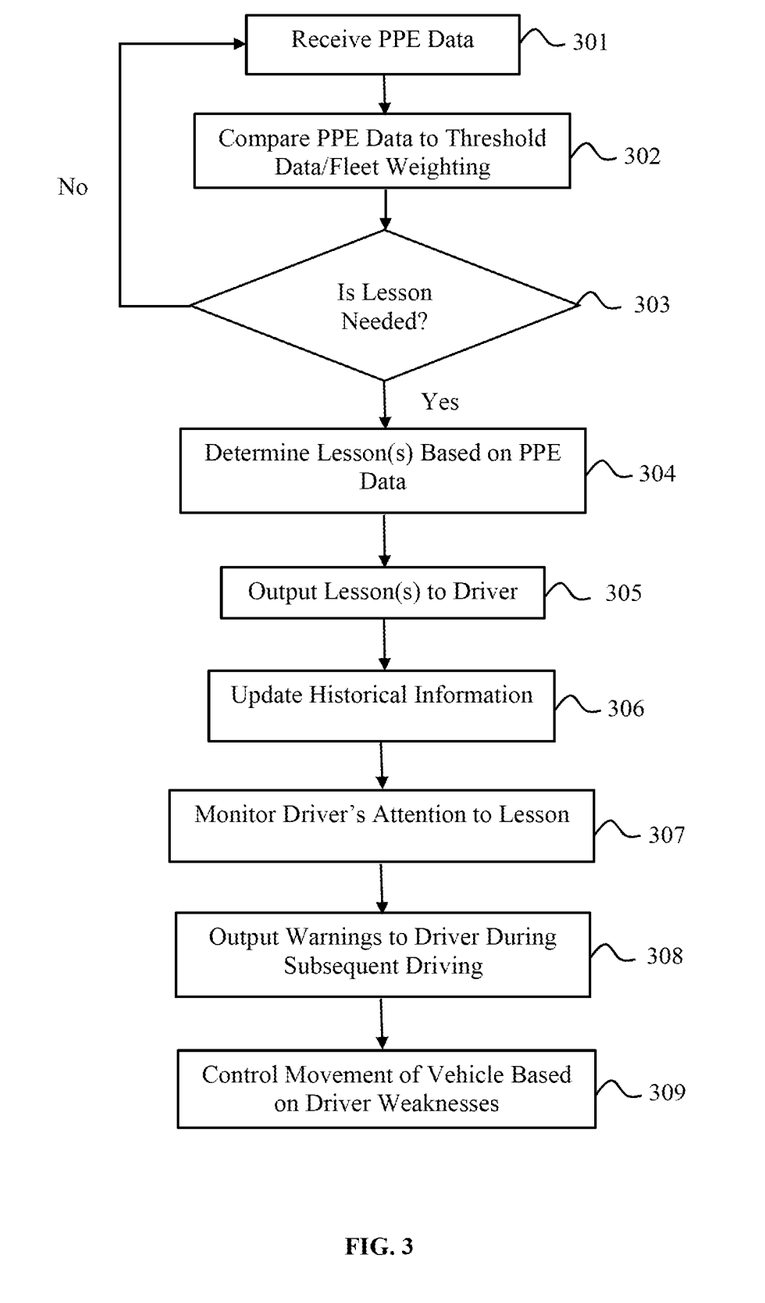
FIG. 3 illustrates a method according to an embodiment of the present invention.

FIG. 3 illustrates a method according to an embodiment of the present invention. Systems for wirelessly collecting and transmitting safety data and video from a vehicle, such as SafetyDirect®, record events produced by extreme signals, e.g., excessive braking, unwanted lane departure, insufficient headway, etc. The recordings contain video of the event (before, during and after, so pre- and post-event (PPE) data) and the vehicle/driver signals/dynamics during the event (brake pressure, steering angle, speed, deceleration, location, etc.). The system according to the present invention provides an improvement over existing systems at least in part by automatically generating and providing lessons to drivers based on the PPE data for the purpose of improving the driving of drivers who produce too many of these extreme events.

According to the method illustrated in FIG. 3, PPE data is received by the processor 230 in step 301 and compared to threshold data for various parameters (e.g., brake pressure, steering angle, speed, deceleration, location, etc.) in step 302. Based the results of the comparison, and accumulated over time, the processor 230 determines in step 303 whether a lesson is needed by the driver. The particular lesson(s) to be provided to the driver are determined in step 304, after which the lessons are output to a computing device 270 of the driver in step 305 such that the lesson text and audio are in sync with the video. As described below, the lessons can include a variety of videos, text and narration for the purpose of instructing the driver on improved driving processes.

According to the present invention, the PPE signals associated with an event are analyzed, and if sufficiently many events occur within a predetermined time span or distance, a lesson is generated. The lesson pedagogical material may be broken into three parts—a title for the lesson, the illustrations, and the accompanying text, which may include narration. That is, it identifies what the driver shall learn (e.g., better braking reactions for cut-ins), the videos that show such mistakes, and what the text/narration with these videos shall be.

Drivers often have a particular weakness, such as frequently leaving too little space to the vehicle ahead. An automatic event classification system, described in other disclosures, ranks events by their degree of interest and how coachable/correctable they are. The system according to the present invention automatically accumulates an "interest mass" for individual event types, e.g., excessive braking, excessive speed, etc. for each driver over time or distance. As indicated in step 302, the interest mass may be further weighted by the fleet, and then summed, by using, for example, the event weighting in Safety Direct® scoring. The weighting need not be the same as is used for scoring, and a separate "rice=relevant in coaching effort" weighting may be employed. If the sum exceeds a threshold, or perhaps if an individual event type's summed interest mass does so, then coaching is called for. The event type with the highest accumulated (possibly weighted) "interest mass" per event corresponds to that driver's most critical behavior and thereby the event type that needs most improvement. A lesson is indicated if the accumulated, summed, possibly weighted, mass per mile or time exceeds a threshold. A moving window over time may entirely or partially remove/discount old events more than recent ones, thus adjusting to a driver's current behavior better. For example, an exponentially weighted moving average filter may be used to favor current event statistics over older material.

Such a threshold-exceeding event type is then the focus of the lesson. A lesson may have two foci if desired and indicated (e.g., driver Smith frequently has low headway AND has had two episodes of Collision Mitigation Braking, where both have exceeded a (individual) threshold for the recent time or distance interval). It may be desirable to have more frequent, shorter, lessons, given as needed, versus longer, less frequent, ones. These shorter lessons may have the same focus as earlier ones, and thus serve to reinforce learned improvements. Spaced repetition pedagogical methods may be applied to reduce mistakes that persist in spite of frequent lessons.

The lesson may include negative illustrative material, which includes videos showing the event type whose interest level exceeds a threshold or simply those videos with the highest interest levels if none reach the threshold. If many videos are available, a diversity constraint may be applied to ensure illustrative variation in the videos. For instance, a daytime video and a nighttime video may be chosen showing the same event type occurring, or one video in an urban area and another on the highway. Alternatively, the system may show a high-speed version of the event as well as a low-speed one. If a driver has particular problems at nighttime, the system may choose to show two nighttime videos and just one (or none) daytime video. This diversity constraint corresponds to enclosing a maximum area or volume in a categorical space of day/nighttime, environment type (urban/non-urban, measured, for example, from maps), and speed. Other categories may be added as needed, e.g., wet/dry, familiar road/unfamiliar road, winter/summer, etc. If many events of the same type occur under many circumstances, more videos may be chosen to ensure coverage of the many circumstances. Enforcing diversity of the lesson material aims to cover and correct for the varieties of circumstances under which a driver has problems.

Positive example videos are also provided to the driver by the system. A given event prequel does not necessarily imply the event and sequel. For instance, a good driver, upon getting cut in on, may promptly back off and cushion against possible future problems. A bad driver may not be as defensive, or not react as quickly, and not properly back off. The system may locate positive videos in the data bulk collected by on-vehicle DVR systems, choosing similar prequel data to match the negative illustrative material. Similar prequel means having similar distances and speeds and possibly curve radii, lane marking type, urban/non-urban, daytime/nighttime, wet/dry, winter/summer, etc. values. These values may be evaluated over, e.g., the last 8 seconds before an event occurs (event recordings typically contain the 10 seconds before and 10 seconds after the event; subtracting the approximately 2 seconds of human reaction time leaves 8 seconds of prequel). For instance, one may sum the differences in distance and speed, for every second before an event, producing a single measure of difference between two PPE prequels; a smaller sum of differences means two event prequels are more similar as opposed to a larger sum of differences. Other drivers' DVR data may be used for these positive examples (these having the same or sufficiently similar prequel). Also, the vehicle type may be considered in choosing positive examples. For example, we would not want to use a light truck's more nimble reactive capabilities as a positive counterpart for a heavy truck's issue. The positive companion videos may be identified in an ongoing manner for a driver's events as they come in. This did (sub-optimally) do/should (better) have done event pairing may be done for a cut-in scenario, for example, and can also be applied to scenarios such as taking curves, stop lights, following distance, braking reactions, handling down-hill braking, highway lane-changing behavior, etc.

As described above, the lesson may include narration to the driver. The PPE sequence record shows what happened, including what the driver did, and so also what went wrong or was done wrong. There is a narrative that corresponds to what went wrong as shown in the PPE record (for example, the following distance was less than one second at some point; a simple "one second away . . . now" narration will identify this point and the problem). A second trained system associates and synchronizes narratives, taken as templates (e.g., "you should start braking . . . now" or "you should steer back into the lane . . . now"), with the PPE data, and thus a triplet of video+PPE data+narrative is generated. During the lesson the driver is presented with all three, with the narrative possibly also being spoken.

Narration generation may be regarded as using PPE data to index into a lookup table, this may be explicit or implicit in, e.g., via a time dependent neural network. For instance, given relative speed and distance data to the forward vehicle, we may read at what deceleration value our host vehicle should be operating. This reading from a table operation may be done for the whole PPE length, and a comparison with the driver's actual actions be made. From the comparison we may see if the driver started acting too late, too weakly, failed to act, etc.

Figure 4:
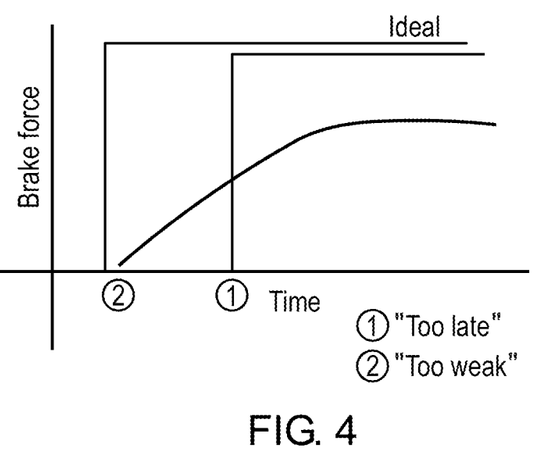
FIG. 4 illustrates two example scenarios referenced to ideal behavior and the resulting narrative snippets.

FIG. 4 shows two example scenarios referenced to ideal behavior and the resulting narrative snippets, shown at the time they would be read (aloud). Because the system has the entire event episode ex post facto, it has the benefit of time and hindsight here and can consider the whole history. Narration is presented at the appropriate time, as shown.

A question and delayed answer approach may be applied to presentation of the videos. For this, a narration-free playback of the video is first given, presenting the undesired behavior, followed by a second, now narrated, playback of the same video. The familiarity created with by the first showing aids in comprehension of the correct answer shown in the second. We may then also show a positive response to the same or a similar prequel, using a video chosen as described above.

Another type of narrative may be generated for the video from a driver facing camera. For instance, the system may read head pose from the video to verify mirror usage before a lane change, noting that a driver did not check his mirror as should have happened. This sort of commentary, which is more global and regarding something that was not done, may be given after the video has finished playing, as it is not time specific. Similarly, the system may see that a driver did not have both hands on the steering wheel during the event and present this if analysis has detected improper/missing actions on the driver's part, the system may activate additional functionality on the vehicle to monitor for this, or perhaps alter parameters to favor greater safety. The result would be three types of narration: (1) an introduction to what the lesson is about, (2) a narration given at appropriate moments while viewing event videos, and (3) a narration summarizing the driver's mistakes, given after all the videos have been seen. This tripartite repetition of the mistakes made improves understanding and reinforces desirable behaviors (i.e., the concept of "tell them what you will talk about, talk about it, and then summarize what you have just talked about").

If desired, the automatically generated lesson content with Title/Videos/Narration may be inspected by a fleet operator before it is sent/given to the driver. The driver is informed that there is a lesson waiting, and the assembled material is pushed to a device that the driver uses. The driver logs into the device, watches the lesson, and logs out. On completion of logout, the system may monitor the driver for improvement in the coached event types via SafetyDirect®. Improvement may be seen in a reduced incidence of events.

In summary, a driver's actions and events on the road are monitored by the system. When enough event interest mass accumulates for an event type, it is determined that the driver is in need of correction, and thus given a lesson. The videos, PPE data and corresponding "you should have done x" narration are presented to the driver on a computing device. At the conclusion of the lesson, which is monitored for having been completely viewed, by the correct person (is there a face visible and is it the driver of interest?) a signal is sent from the computing device signaling lesson completion. Also, as shown in step 307 in FIG. 3, the driver's attention may be monitored during the lesson using the device driver facing camera and for specific future improvement after the lesson.

The following is an example of the above-described process. Driver Jones drives 8,000 miles in a month, during which he produces or is involved in, 50 excessive braking episodes. These episodes are expensive (from increased brake wear and wasted fuel) and unsafe, and thus it is desired to help him avoid them. The rate of 160 (i.e., 8,000 miles/50 excessive braking episodes) miles between such events is unacceptable by fleet standards, which triggers an automatic lesson assembly and delivery mechanism.

An automatic event classification (AEC) system eliminates 10 of these episodes as not being coachable since the system determines that the driver could likely not have avoided them. It is determined that the remaining 40 episodes tend to occur in the afternoon, after the driver has already been working a long time (e.g., since 8 AM), and when approaching a traffic light or similar situation at which a full stop occurs.

The AEC system identifies this typical pattern (clustering finds the two most common times for event occurrences (e.g., 14:15 and 16:30), and a typical, e.g., via averaging, distance/speed/braking force time history for each). A video is found for each central time that is deemed sufficiently coachable by the AEC, whose PPE time history is near or perhaps worse than the typical evolution. The 16:30 time cluster further splits into two speed regimes, one at lower speed (e.g., 25 mph) and the other at a higher speed (e.g., 45 mph), so a typical video is found for each speed regime. Three representative and teachable videos have thus been identified, from the driver's behavioral patterns, along with their corresponding PPE histories.

Figure 5:
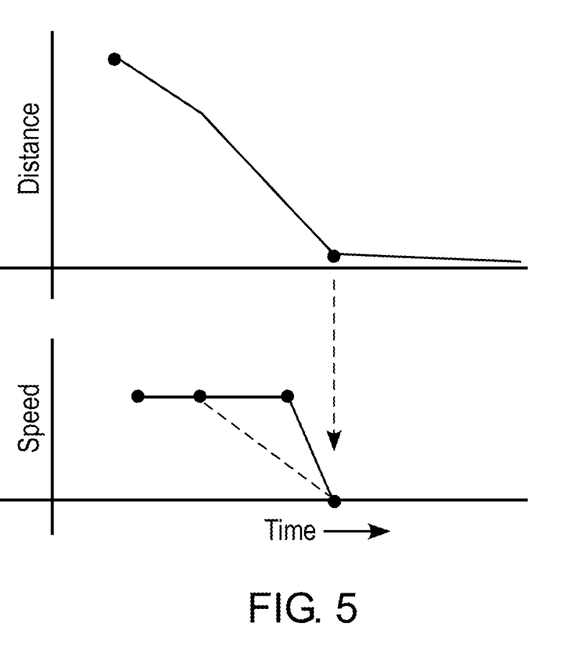
FIG. 5 illustrates typical time history of distance to a vehicle ahead and ego-vehicle speed.

A typical time history of distance to the vehicle ahead and ego-vehicle speed is shown in FIG. 5. A steady decrease in distance may be seen, abruptly stopping at a constant distance. The corresponding speed history shows that the ego-vehicle continues at a high speed until a sudden, rapid, drop occurs, reaching zero when the above constant distance is reached. The sudden, rapid, drop is achieved by excessive braking, and a different behavior should avoid this undesirably high deceleration.

A more desirable speed history is shown as a dashed line in FIG. 5. Ego-vehicle speed is reduced earlier and more gradually, for which a mix of engine and regular braking may be used, thus saving fuel, reducing forces on the vehicle, and allowing for a safer, more controlled, approach. A machine analysis of the distance history shows that there is no target change during the driver's excessive braking, so a different braking approach could have been used and presumably would have worked. The better approach is calculated from the forces that are desired for the approach. The system generates a suggested, better braking history, and identifies when this improved braking history should start (a desirable deceleration level is used, as well as the amount of deceleration that engine braking can produce, and their sum can be used to extrapolate back to when such braking should start). A video indicating that the braking could have been safer and illustrating what it would have looked like may even be generated, where the still images corresponding to the desired distance remaining to the target are repeated as needed. Images from the original are repeated as needed for this to create the desired distance, visual approach history. The background beyond the target vehicle may be blurred to focus student attention on how the target size would vary during a good approach. Alternatively, a real, positive example, video with the desired, good, approach history may also be shown.

A narration is generated for this time point, such as the following: "start braking, . . . now" with the "now" synchronized to when the braking should have started. As mentioned above, the driver is first shown the unnarrated video for familiarization purposes, after which the same, now narrated, video is shown, indicating the correct, better behavior to avoid excessive braking. Text may also be shown to indicate that both engine and regular braking should be used. Similar "you should have behaved like this" behaviors, narration, texts and videos may be generated for the other identified videos.

A summary may be given to the driver regarding the event type in general. For instance, in a case of excessive braking, the system may indicate that earlier braking and more anticipation should be used. The system may also sensitize the driver to when (14:15 and 16:30) and under what circumstances (coming to a stop at a traffic light) excessive braking episodes tends to occur. Vehicle warning or support parameters may be altered, at these times, to reflect the driver's specific times of weakness/vulnerability/potential poor behavior.

The videos, the narration, and the summary are assembled, and can be sent as a lesson to the driver's device (e.g., phone, pad, PC). Timely and proper, attentive, consumption of the lesson by the targeted driver may be verified and post-lesson improvement monitoring mechanisms may be triggered.

The system also provides a diversity attribute to the lessons. The above example mentions clustering in time (at 14:15 and 16:30) and in speed regimes (25 and 45 mph). Clustering identifies center(s) of recurring event patterns, and so collapses many events into one. Diversity works the other way, however, and looks for differences from the collapsed patterns that are too large to ensure that coverage of other event circumstances is also present. For instance, with the >2 hour time difference between mid- (14:15) and later- (16:30) afternoon may be important as rush hour traffic, with its higher demand and density, applies to the second. A single average time of 15:22, halfway between the 14:15 and 16:30 clusters may not represent the (bimodal) event distribution well. Similarly, with the speed clusters separated by 20 mph, and with sufficiently many events (say >30%) present in each, it is desirable that each speed regime be included. That is, the system determines whether a single cluster is too large (e.g., choosing a central time of say 15:22 does not cover either the 14:15 or 16:30 times very well) and it is better split into two, tighter, denser, ones. Metrics for optimal cluster number, such as the average silhouette or gap statistic may be used to determine whether further splitting is warranted, along with the minimum percentage membership constraint per cluster. Other axes along which to split the data may include night and day, environment (e.g., city/country), time since trip start, trip length, etc.

Based on the data gathered during the PPE, the system reconstructs when braking should have started. For a vehicle ahead moving (for simplicity) at a constant speed v0, the system subtracts this constant value from our faster speed, giving the relative speed between us. At some point, we are a given distance Dstart away from the target, and commence braking, which we take to produce a constant deceleration a. Our goal is to arrive at a zero relative speed, and a desired following time (e.g., at 2*v0=D0 away, a two second following time or distance). When shall braking start and how far away are we then (radars typically measure at least distance, and so this distance to start braking is useful).

At times before the event our following distance was larger as represented by the following equation:

$$D=D0+\int v\,dt=D0+\int at\,dt=D0+(½)*a*t^2.$$

Our relative speed is a*t (since we want to arrive at zero relative speed at t=0). We start at some initial relative speed $v^*_{init}$. This reduces to zero at a constant deceleration, so braking needs to start at $V_{init}/a$.

This "start braking" time corresponds to a distance of $$D0+(½)*a*(v_{init}/a)*(v_{init}/a)=D0+(½)*(v_{init}*v_{init}/a)$$

This calculation may be used to indicate to a driver, in a video that is played, when braking should have started. The time difference between when braking should have started and when it did, aka the driver's shortcoming, may be used to alter in-vehicle warnings, as is now described.

The classic coaching model is tripartite: first, a problem is detected, second, coaching is done, and third, (hopefully) performance improves. This approach separates the problem from its solution and assumes that learning is separate from driving. Such a binarized approach, in which coaching is done separately from driving, need not be the case, however.

The present invention is directed to an individualized, continuing education, integrated "learning while driving" approach to coaching for performance improvement. According to this approach, in steps 308 and 309 of the method shown in FIG. 3, coaching derived warnings and simultaneous support are given earlier (than they normally would be), and in a special way. For instance, before an impending lane departure, subtle but insufficient one-sided braking Lane Keeping Assist is given in the time before the usual LDW warning is issued, along with a distinct pre-warning, allowing for human correction. Or longitudinally, where automatic but again insufficient braking is started and signaled at the point in time when it should happen, but without enough amplitude for complete control. The human is thereby informed, aided, and encouraged to intercede, all in parallel. The degree of machine intercession is settable and may decrease as driver performance improves. With proper, timely, proportional intercession, the human may thereby avoid the impending normal warning and not create a SafetyDirect® Event.

Thus, as illustrated in step 308 in FIG. 3, the system provides two-stage warnings to the driver: pre-warnings ("beep") given at a time derived from the driver's specific shortcomings, for instance, indicating that he is within his specific weakness time—beep beep beep BOOP ("BOOP" is the usual warning), with pre-warnings reducing in number/intensity/character as the driver behaves better, indicating improvement—a sort of ongoing lesson, with continuing, real-time, feedback. These pre-warnings are followed by the usual warning, if appropriate, at the usual time. If one had only the usual warning ("BOOP"), learning can take place, but the information is incomplete. How close is the driver getting to triggering the usual warning(s)? Is improvement happening? That cannot be known if warnings are not triggered, and even if they are, one has only binary information ("I caused a warning"). With pre-warning, improvement may be proportionally perceived, even without the usual warnings occurring, and thus the usual warnings are avoided or at least made less frequent.

The following is an example that measures following distance, where the driver is approaching a vehicle ahead, moving at speed v. A two second following distance is desired, so a separation of 2*v is the target separation value. Our target driver has had multiple episodes where he approaches within 1.2 seconds of the vehicle ahead (e.g., his $90^{th}$ percentile of following time is 1.2 seconds). This 0.8 second deficit is 100% "mirrored" about the desired value of 2 to (2+100%*0.8)=2.8 seconds, which becomes the time when the pre-warnings shall start. Note that the mirroring reflects the driver's following time shortcomings (up to some maximum value, we don't want to warn when 6 seconds away, say; also, a different percentage of the deficit may be used instead of the full 100%; the mirroring percentage is specific to each driver's shortcomings). Normally a warning would not be given so temporally far away (the driver is not unsafe by the usual 2 second definition), and now that it is given, it shall be informative. Being only 0.8 seconds before—potentially— the usual warning, we want to distinguish it from the usual warning, thereby making it useful to the driver.

Accordingly, the (informative) character of the warning, which shall depend on the speed delta to v, must be decided. Higher speed differences lead to more urgent pre-warnings, and, e.g., higher frequency or shriller pre-warnings. Lower speed differences, at 2.8 seconds away, lead to less urgent or mellower pre-warnings, as the driver has more time to correct. Note that we can suppress the pre-warnings entirely if we reach the lead vehicle's speed v at 2.8 seconds away already. Perhaps this 2.8 second distance is what the driver understands as the target, in which case, with performance improving and no or fewer <2 second following time episodes occurring, the 2.8 seconds can be reduced to, e.g., 2.4 seconds, then 2.2 seconds, etc. The reduction in pre-warning time may be done as the spatial or temporal frequency of real ("BOOP") warnings decreases. There can be a minimum frequency for mellow warnings (e.g., 100 Hertz) and a maximum one for shrill ones (e.g., 3,000 Hertz). There may be a smoothing function applied to the pre-warning time, thus tracking the driver's improvement or deterioration. As the driver shows improvement, pre-warnings become generally mellower and shorter. If a driver shows worsening deterioration, pre-warnings become shriller and longer.

As noted above, the pre-warnings differ from the usual warning. The two-character nature of the warnings thus indicates one's distance from the desired behavior. Note that warnings are often time-coupled, so the pre-warning may be of a short duration (e.g., 1 second only, given just before the "real" warning is reached). If the pre-warning were of the same sound (frequency, timbre, etc.) as the regular, main warning, the driver would not know she had been having problems. By making the pre-warning's sound (frequency, timbre, envelope, etc.) different from that of the main, usual warning, learning may occur. Furthermore, since the warnings are time-coupled, we may alter the frequency of the pre-warning in tandem with its length. The driver is doubly informed, and, e.g., able to "push the pre-warning" out of the audible range, back to "zero" and improved safety. We may collect statistics of the driver's behavior over the last few days, say, and have improvements there be reflected in the current day's pre-warnings, creating ongoing, adaptive feedback before events would/might occur.

The following are examples of possible lesson titles/themes:
GET THE BIG PICTURE.
AIM HIGH IN STEERING.

STOP AT STALE GREEN LIGHTS.
LEAVE YOURSELF AN OUT.
SHORT FOLLOWING TIME.
POOR ANTICIPATION.
USE YOUR MIRRORS AND GAUGES.
TOO FAST FOR CONDITIONS.
GO SLOW IN RAMPS.

These are recurrent themes in commercial vehicle driving and coaching. The assignment of a title to a lesson is done by examining the PPE data, where the event occurred, and other circumstances (weather, day or night, temperature, etc.). For instance, if the PPE data shows (multiple episodes of) a full stop being reached, though with excessive braking deceleration, and these occur at an intersection or stop light (maps show this information), then the "stop at stale green lights" title may be chosen. If these episodes tend to occur in sub-freezing temperatures, where traction may be reduced, then the title may be modified to "winter stop at stale green lights," and so on.

Similarly, if multiple PPE records show a too short following distance (or time), then we may choose the "short following time" title, perhaps quantifying it with the bounds of or typical speed (speeds or range) and/or times of day when this occurs. The assistance and pre-warnings may be matched to these bounds or typical speeds. With following too closely, given excessive speed being a very frequent driver shortcoming, we may have speed sensitive in-vehicle warnings. For instance, if a driver has poor distance keeping at medium highway speeds (e.g., 40-55 mph), then pre-warnings may be given only within this speed range. In this way, the driver is individually supported, in those specific conditions where he wants/needs assistance. An ongoing, in the vehicle, proportional, assisted, continuing driver education functionality is thereby realized.

The present invention provides the following additional benefits. Coaching is typically a human driven activity that occurs when the need is indicated. Coaching is typically "pushed" to the driver (by the fleet), but this also need not be the case. Instead, the driver may "pull," on her own initiative, automatically generated, on-demand lessons from the system. The lessons may contain the elements of title, positive and negative examples, and text and narration, as described above. The reversed paradigm allows for more timely learning in between "real" coaching sessions. The lesson(s) may also give the driver feedback of whether improvement is taking place or not, that is, rather than a lesson (with perhaps a negative connotation) a feedback opportunity is realized, both positive and negative. A reordering and recapping of any changes ("where you were last time, where you are now") since the last "lesson on request"—both positive and negative—may be done when the next "real" coaching session is given, providing human confirmation of these changes. Thus, the present invention provides a number of technical improvements over conventional systems and methods for monitoring a driver's operation of a vehicle.

The present invention is further directed to a non-transitory computer-readable medium storing a program which, when executed by a processor, causes the processor to perform the above-described operations. More generally, various processor-enabled features of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as a floppy disk, CD-ROM, hard drive, USB (universal serial bus) drive, magnetic tape, any other magnetic medium, a CD-ROM, any other optical medium, punch cards, paper tape, any other physical medium with patterns of holes, a RAM, a PROM, an EPROM, a FLASH-EPROM, any other memory chip or cartridge, any other medium from which a computer can read, or any other machine-readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for monitoring a driver's operation of a vehicle and automatically providing a lesson to a driver based on the monitoring, comprising:
    a processor;
    a memory in communication with the processor, the memory storing a plurality of instructions executable by the processor to cause the system to:
        receive input data generated by an onboard vehicle computing system specifying actions taken by the driver while operating the vehicle;
        determine based on the input data whether a driving event, requiring the lesson to be output to the driver, has occurred during the driver's operation of the vehicle;
        analyze the driving event based on threshold data stored in the memory; and
        automatically output the lesson to the driver based on results of the analyzing of the driving event, wherein the lesson includes a plurality of event types; and a display screen configured to provide the lesson to the driver;

wherein the processor is programmed to control movement of the vehicle based on the results of the analyzing of the driving event during a subsequent operation of the vehicle by the driver including providing a machine intervention by the vehicle prior to a time at which the driver should implement a driver movement of the vehicle and prior to outputting a warning to the driver to implement the driver movement, thereby prompting the driver to control the vehicle in a manner corresponding to the machine intervention, wherein the machine intervention is less than what is required for complete control of the movement of the vehicle, and a degree of the machine intervention is settable and decreases as driver performance improves;

wherein the lesson includes a video, including examples of correct and incorrect driver operation for the driving event, output to the driver on the display screen and a text output to the driver in sync with the video;

wherein the processor is programmed to select a plurality of different examples of the driving event based on a diversity constraint that ensures illustrative variation in the different examples output to the driver, the diversity constraint including at least two of day/night time, urban/non-urban environment, high/low speed, wet/dry road, and winter/summer; and wherein the lesson further includes an audio narration output to the driver in sync with the video, at least one of the text and the audio narration including a statement indicating a particular driver action that should have occurred at a specific time during the driving event and outputting the statement at a time during the video corresponding to the specific time during the driving event when the driver should have initiated the particular driver action.

2. The system according to claim 1, wherein the driving event is determined to have occurred based on a determination of a frequency of the driving event.

3. The system according to claim 1, wherein the plurality of event types included in the lesson are selected from an excessive braking event, an excessive curve speed event, a lane departure warning event, an excessive lane departure event, and a lane change without turn signal event.

4. The system according to claim 1, wherein the processor receives a lesson complete signal after completion of the lesson.

5. The system according to claim 4, wherein global fleet policy-related narration is generated and presented to the driver after the lesson has been completed.

6. The system according to claim 1, wherein the video is output to the driver with the input data.

7. The system according to claim 1, wherein, based on the results of the analyzing of the driving event, the processor is programmed to output one or more pre-warnings to the driver at a time derived from specific shortcomings of the driver indicating that the driver is within a time period associated with the specific shortcomings and in sync with the controlling of the movement of the vehicle and prior to outputting a normal driver assistance warning.

8. The system according to claim 1, wherein the lesson is provided to the driver in response to a request from the driver, and the driver is provided with feedback indicating whether the driver's operation of the vehicle has improved since a previous lesson.

9. The system according to claim 1, wherein the analyzing of the driving event includes determining when, where, and under what conditions the driving event occurred.

10. A method for monitoring a driver's operation of a vehicle and automatically providing a lesson to a driver based on the monitoring, the method comprising:

receiving input data generated by an onboard vehicle computing system specifying actions taken by the driver while operating the vehicle;

determining based on the input data whether a driving event, requiring the lesson to be output to the driver, has occurred during the driver's operation of the vehicle;

analyzing the driving event based on threshold data stored in the memory;

automatically outputting the lesson to the driver based on results of the analyzing of the driving event, wherein the lesson includes a plurality of event types selected from an excessive braking event, an excessive curve speed event, a lane departure warning event, an excessive lane departure event, and a lane change without turn signal event;

controlling movement of the vehicle based on the results of the analyzing of the driving event during a subsequent operation of the vehicle by the driver including providing a machine intervention by the vehicle prior to a time at which the driver should implement a driver movement of the vehicle and prior to outputting a warning to the driver to implement the driver movement, thereby prompting the driver to control the vehicle in a manner corresponding to the machine intervention, wherein the machine intervention is less than what is required for complete control of the movement of the vehicle, and a degree of the machine intervention is settable and decreases as driver performance improves; and selecting a plurality of different examples of the driving event based on a diversity constraint that ensures illustrative variation in the different examples output to the driver;

wherein the lesson includes a video, including examples of correct and incorrect driver operation for the driving event, output to the driver on a display screen and a text output to the driver in sync with the video; and wherein the diversity constraint includes at least two of day/night time, urban/non-urban environment, high/low speed, wet/dry road, and winter/summer; and wherein the lesson further includes an audio narration output to the driver in sync with the video, at least one of the text and the audio narration including a statement indicating a particular driver action that should have occurred at a specific time during the driving event and outputting the statement at a time during the video corresponding to the specific time during the driving event when the driver should have initiated the particular driver action.

11. The method according to claim 10, wherein the driving event is determined to have occurred based on a determination of a frequency of the driving event.

12. The method according to claim 10, further comprising:

receiving a lesson complete signal after completion of the lesson.

13. The method according to claim 12, wherein global fleet policy-related narration is generated and presented to the driver after the lesson has been completed.

14. The method according to claim 10, wherein the video is output to the driver with the input data.

15. The method according to claim 10, wherein, based on the results of the analyzing of the driving event, one or more pre-warnings are output to the driver at a time derived from specific shortcomings of the driver indicating that the driver is within a time period associated with the specific shortcomings and in sync with the controlling of the movement of the vehicle and prior to outputting a normal driver assistance warning.

16. The method according to claim 10, wherein the lesson is provided to the driver in response to a request from the driver, and the lesson includes feedback indicating whether the driver's operation of the vehicle has improved.

17. The method according to claim 10, wherein the analyzing of the driving event includes determining when, where, and under what conditions the driving event occurred.

18. The system according to claim 7, wherein the processor is programmed to determine whether the actions taken by the driver improve over time, and to reduce the pre-warnings in number and intensity based on the determination that the actions taken by the driver improve.

19. The method according to claim 15, wherein the processor is programmed to determine whether the actions taken by the driver improve over time, and to reduce the pre-warnings in number and intensity based on the determination that the actions taken by the driver improve.

20. The system according to claim 1, wherein the lesson is provided to the driver in response to a request from the driver, and the driver is provided with feedback indicating whether the driver's operation of the vehicle has improved since a previous lesson.

21. The system according to claim 1, wherein the audio narration includes an introduction to what the lesson is about, a narration given at appropriate moments while viewing event videos, and a narration summarizing mistakes made by the driver after all the event videos have been watched.

22. The system according to claim 1, wherein the lesson provided to the driver is selected based on an accumulated interest mass for each of the event types based on a moving average over time such that recent events are weighted more than older events.

* * * * *